United States Patent [19]

Bender et al.

[11] Patent Number: 4,500,559

[45] Date of Patent: Feb. 19, 1985

[54] METHOD OF INCREASING THE ORGANOLEPTIC ACCEPTABILITY OF SHANK MEAT

[75] Inventors: Fredric G. Bender, Houston; Charles W. Everson, McMurray; William E. Swartz, Upper St. Clair, all of Pa.

[73] Assignee: Stauffer Chemical Company, Westport, Conn.

[21] Appl. No.: 541,949

[22] Filed: Oct. 14, 1983

[51] Int. Cl.³ .............................................. A23L 1/31
[52] U.S. Cl. ................................... 426/646; 426/281; 426/641; 426/652
[58] Field of Search ............. 426/281, 641, 646, 652, 426/533, 534, 656, 56, 58, 59

[56] References Cited

U.S. PATENT DOCUMENTS

| | | | |
|---|---|---|---|
| 2,503,282 | 4/1950 | Lynne | 426/646 |
| 3,037,870 | 6/1962 | Schleich et al. | 426/59 X |
| 3,258,344 | 6/1966 | Shank et al. | 426/646 X |
| 3,645,753 | 2/1972 | Gasser | 426/56 X |
| 3,875,313 | 4/1975 | Brotsky | 426/652 X |

*Primary Examiner*—Arthur L. Corbin
*Attorney, Agent, or Firm*—Paul J. Juettner

[57] ABSTRACT

The concurrent use of autolyzed yeast extract and sodium tripolyphosphate hydrated with a solution containing citrus juice solids greatly improves the organoleptic acceptability of comminuted meats. Less acceptable grades of meat from the standpoint of flavor, such as shank meat, can be upgraded in taste to that of chuck meat.

7 Claims, No Drawings

METHOD OF INCREASING THE ORGANOLEPTIC ACCEPTABILITY OF SHANK MEAT

The present invention relates to an improved combination of additives including primary yeast extract to improve the organoleptic acceptability of meat products.

BRIEF SUMMARY OF THE INVENTION

It has been unexpectedly found that the concurrent use of primary yeast extracts and a sodium phosphate hydrated with a solution containing the juice solids of citrus fruits such as lemon juice solids greatly improves the organoleptic acceptability of comminuted meat products. It has also been found that grades of meat presently less acceptable for use in comminuted meat and as intact muscle meat can be upgraded for that use.

DETAILED DESCRIPTION OF THE INVENTION

By comminuted meat is meant herein comminuted meat products prepared from one or more kinds of skeletal muscle meat and poultry meat including cooked sausage, meat patties and non-specific loaves. Cooked sausage are those comminuted meat products defined by the United States Department of Agriculture in 9 C.F.R. 319.180. Cooked sausage can be illustrated by frankfurters, weiners, bologna, garlic bologna, knockwurst and similar products. In addition to sausage products, the comminuted meat further includes beef patties as defined in 9 C.F.R. 319.15.

Comminuted meat products of the present invention also includes non-specific loaves as defined in 9 C.F.R. 319.280. These include luncheon loaves which are generally chopped or ground meat of beef, pork, veal or lamb molded into a specific shape, such as a square shape, and which can contain cereals, soy and non-fat dry milk as well as other non-cereal extenders and, if desired, flavorings such as chopped nuts, olives, cooked macaroni, pistachio nuts, dry cheese and the like. These loaves can be dry cooked in a smokehouse or canned and cooked in water. The process of the present invention finds particular use in improving meat patties including hamburgers, beef patties, veal patties and the like.

The compositions of the present invention can also be used to improve other meat products such as meat balls, chunked and formed meat, chicken hot dogs and meat containing fillers such as for raviolis.

Beef which is generally corn fed provides meat with the texture and taste to which we have become accustomed. Beef which is range-fed is known to have a "grassy" taste which is less acceptable. Range fed beef is generally used as a lower quality meat source such as in the manufacture of sausages and meat loaves.

It is also known that a type of meat termed "beef shank meat" has a less desirable taste, generally described as "muttony", than other cuts such as chuck which are generally used for ground meat. Because of flavor, shank meat is generally used in sausages where a large amount of spices are present to mask flavor rather than in ground meat patties such as hamburgers.

The organoleptic properties of meat products, and particularly those prepared with range (grass) fed beef or shank beef, such as comminuted meat products, and whole muscle products, such as roasts as well as sectioned or formed meats, can be significantly improved utilizing a combination of autolyzed yeast extract and sodium tripolyphosphate hydrated with water containing lemon juice solids.

The autolyzed yeast extract, also known as yeast autolysate and AYE, used in the present invention, is the yeast extract produced from standard yeast cells by an internal or self hydrolysis caused by the action of proteolytic enzymes occurring naturally within the yeast. The extraction is a water soluble material prepared by removing the cell walls from autolyzed yeast. The autolyzed yeast extract can be prepared from many strains of yeast such as *Saccharomyces carlsbergensis*, *Saccharomyces uvarum* though it is preferred to utilize the primary yeast *Saccharomyces cerevisiae* as the source of the yeast autolysate. The selection of the yeast is dictated by the flavor characteristics provided by the yeast autolysate. One skilled in the art can select the proper yeast based on organoleptic considerations. The autolyzed yeast extract is available as a liquid, concentrate, paste (80% total solids) and powder. The autolyzed yeast extract products are also available in various total solids content, salt content and protein content. Selection of the appropriate material is well within the skill of the art.

The sodium tripolyphosphate hydrated with water containing lemon juice solids can be prepared in accordance with the teachings of U.S. Pat. No. 3,875,313, the disclosure of which is incorporated by reference. Anhydrous sodium tripolyphosphate is hydrated with the equivalent of six moles of an aqueous solution containing 6 to 37% by weight lemon juice solids per mole of sodium tripolyphosphate. However, any dry hydrate composition comprising sodium tripolyphosphate and lemon juice solids in a weight ratio of from about 7:1 to about 70:1 may be used. The hydration is conducted with such a proportion of sodium tripolyphosphate to lemon juice that all the moisture is used in preparing a dry, free-flowing product. The sodium tripolyphosphate can also be hydrated with a solution containing citrus fruit juice solids such as lime solids or combinations of lemon and lime solids. Sodium tripolyphosphate hydrated with water containing lemon juice solids is available from Stauffer Chemical Company under the trademark LEM-O-FOS ®.

Since the sodium tripolyphosphate hydrated with lemon juice solids acts directly on the meat, this material is added directly to the meat. The yeast extract as well as the sodium tripolyphosphate hydrated with lemon juice can be sprinkled into comminuted meat separately or the two can be blended and added to the meat during grinding. The two can also be added in liquid form. For intact meat, liquid injection can also be used.

The yeast extract is used in an amount sufficient to provide an organoleptically acceptable flavor, i.e., to overcome objectionable range or grassy flavor. Generally the yeast extract is used in an amount ranging from about 0.2% to about 1.5%, preferably from about 0.95% to about 1.05% and more preferably about 1% yeast extract based on the weight of the meat in the final product. The sodium tripolyphosphate is used in a ratio to the yeast extract ranging from about 0.3 to about 0.7:1 on a weight basis. Preferably, the phosphate is used in a ratio of about 0.5:1. This ratio is based on the weight of the final product (before cooking).

The use of the yeast extract/sodium tripolyphosphate hydrated with lemon juice in standard comminuted meat products provides a product with better flavor, a more meaty flavor, juicier taste and texture. In shank beef, the invention reduces the "muttony" flavor and increases the corn fed flavor.

While yeast extract demonstrates an improvement in flavor when used alone and the sodium tripolyphosphate hydrated with lemon juice solids shows an improvement in texture and retain moisture when used alone, the concurrent use of these ingredients provides greatly improved palatability and acceptability of comminuted meat products beyond the effect of either product used alone.

The present invention will be more fully illustrated in the Examples which follow. In these Examples, the sodium tripolyphosphate hydrated with lemon juice solids is LEM-O-FOS ® brand from Stauffer Chemical Company.

EXAMPLE 1

The present example was run to evaluate various combinations of sodium tripolyphosphate hydrated with lemon juice and various autolyzed yeast extracts in patties and their effect on beef chuck or beef shank meat.

A meat mix was prepared from either beef shank or beef chuck with additions of fat obtained from around the kidney. The amount of fat used was 25% of the meat block.

One set of patties was prepared from a meat block of chuck and fat and one set was prepared from a meat block of shank meat and fat. The meat was ground 4 times through a table grinder with a 3/16 inch (0.47 cm) plate. Meat formulations were admixed in a mixer according to the formulation set forth in Table 1. The meat was formed into patties with an automatic patty maker and the patties were frozen.

All patties were fried from thawed state at 325° F. (163° C.) for 4 minutes on one side and 2 minutes on the other. The patties were drained on paper towels for 6 minutes before determining yield, i.e. the percent weight of the cooked patty after frying based on the original patty weight.

The following results were obtained:

TABLE I

| Ingredients - Grams | | | | | Average Yield 2 Patties % | |
|---|---|---|---|---|---|---|
| Meat | STPP-Lem J. | AYE 1 | AYE 2 | Water | Chuck | Shank |
| 1000 | 0 | 0 | 0 | 0 | 67.81 | 54.88 |
| 970 | 5 | 0 | 0 | 25 | 65.04 | 61.93 |
| 990 | 0 | 10 | 0 | 0 | 63.95 | 58.69 |
| 960 | 5 | 10 | 0 | 25 | 62.61 | 69.5 |
| 990 | 0 | 0 | 10 | 0 | 65.88 | 59.26 |
| 960 | 5 | 0 | 10 | 25 | 67.51 | 63.1 |

AYE 1 = autolyzed yeast extract powder. (*Saccharomyces cerevisiae* powder from Stauffer Chemical Co.
AYE 2 = autolyzed yeast extract (*Saccharomyces cerevisiae*) paste from Stauffer Chemical Company.

Informal tasting of the fried patties judged the sodium tripolyphosphate hydrated with lemon juice solids in combination with autolyzed yeast extract treatment of shank meat to be more like chuck than any of the other treatments of shank meat.

What is claimed is:

1. A method for increasing the organoleptic acceptability of a meat product containing meat and fat, said meat consisting of shank meat, which comprises blending with said meat product a composition of autolyzed yeast extract and sodium tripolyphosphate hydrated with a solution containing citrus juice solids.

2. The method as recited in claim 1 wherein said citrus juice is lemon juice.

3. The method as recited in claim 2 wherein said sodium tripolyphosphate hydrated with lemon juice solids is used in a ratio to said autolyzed yeast extract ranging from about 0.3:1.0 to about 0.7:1.0.

4. The method as recited in claim 2 wherein said sodium tripolyphosphate is hydrated with lemon juice solids and wherein the water of hydration contains lemon juice solids in an amount equivalent to one part by weight per 7 to 70 parts by weight of the sodium tripolyphosphate.

5. The method as recited in claim 1 wherein the autolyzed yeast extract is derived from the yeast *Saccharomyces cerevisiae.*

6. The method as recited in claim 1 wherein said meat product is a comminuted meat product.

7. The method as recited in claim 1 wherein said comminuted meat product is ground meat patties.

* * * * *